A. E. HURST.
WINDOW FLOWER BOX.
APPLICATION FILED NOV. 22, 1916. RENEWED AUG. 13, 1917.
1,293,785.  Patented Feb. 11, 1919.
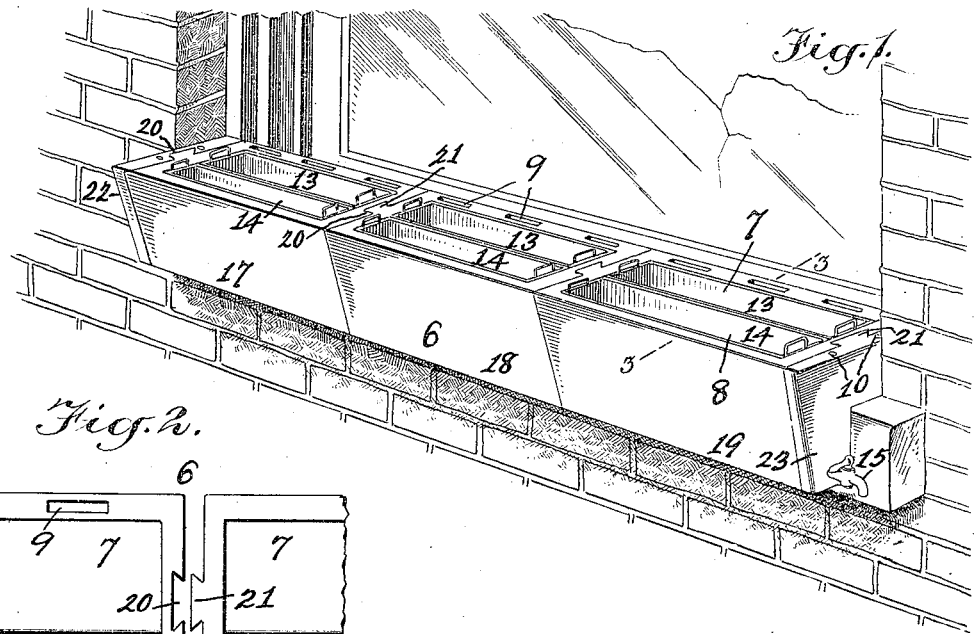
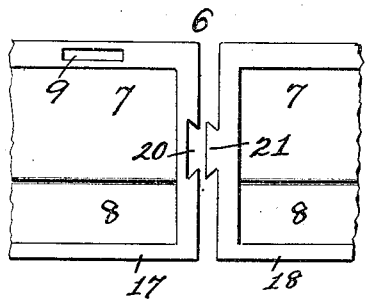
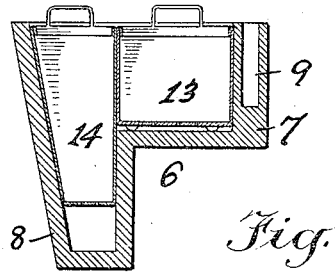
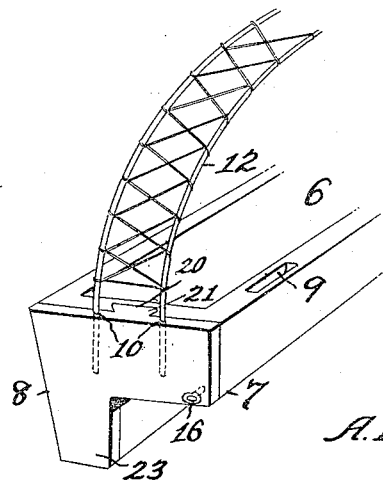
WITNESSES
INVENTOR
A. E. Hurst

UNITED STATES PATENT OFFICE.

ALBERT E. HURST, OF NEW YORK, N. Y.

WINDOW FLOWER-BOX.

1,293,785.                              Specification of Letters Patent.     Patented Feb. 11, 1919.

Application filed November 22, 1916, Serial No. 132,771.   Renewed August 13, 1917.   Serial No. 186,055.

*To all whom it may concern:*

Be it known that I, ALBERT E. HURST, a citizen of the United States, and a resident of New York, in the borough of New York, county of New York, and State of New York, have invented certain new and useful Improvements in Window Flower-Boxes, of which the following is a specification.

My invention relates to window boxes for flowers, vines, and the like, and one of the main objects thereof is to provide such boxes of a construction allowing for the maximum of air and light in the interior of the room though which insure a sufficient depth of soil for the plants or vines.

A further object is to form the boxes of such a cross-sectional formation as will allow of a maximum soil area and aid in maintaining the boxes in position on the sills of the windows.

A further object is to construct the boxes in such manner as to receive the soil directly or to receive insert soil containers, preferably of different depths of soil in order to adapt the same to different plant requirements, and to enable the reversal of said containers from time to time to equally expose both sides of the plants to the sunlight and thereby insure an even growth of the plants.

A further object is to provide separable units in order to adapt the boxes to windows of different widths and to provide connecting means whereby a unitary structure results by the joining of several units, and also to provide end finishing panels for each complete box, as well as suitable drainage therefor and means for anchoring the box in place.

A further object is to provide recesses in the back of the box which serve the dual function of lightening the weight of the box and of wells for the reception of water in which cut flowers may be placed.

A further object is to rearwardly incline the front of the box so as to permit of a natural and graceful hanging of vines, and a still further object is to provide recesses in the upper edge of the box for the reception of attachments, such as brackets for potted plants, a trellis for vines, or similar devices.

My invention is fully described in the following specification, of which the accompanying drawings form a part, in which like characters refer to like parts in each of the views, and in which:—

Figure 1 is a perspective view of one embodiment of my invention, in position on a window sill;

Fig. 2 is a fragmentary plan view of two separated units and their connecting means, when such units are used;

Fig. 3 is a cross-sectional view showing the inverted L-shape, as well as insert containers which may be employed, and the permanent well for cut flowers;

Fig. 4 is a fragmentary view showing a bracket attachment for a flower pot; and

Fig. 5 is a similar view showing a trellis for vines.

Referring to the drawings, 6 represents a box having a relatively shallow inner member 7 and a relatively deep member 8 at the outer side thereof whereby two soil depths are provided for plants of different requirements, the inner member 7 being adapted to rest upon a window sill and the outer member 8 depending from the sill over the outer face thereof, this latter member aiding in maintaining the box in place and greatly increasing the surface area of the box and allowing passage of a maximum amount of light and air to the interior of the room.

The rear wall of the box is provided with wells 9 for the reception of cut flowers, and the end walls are provided with recesses 10 for the reception of brackets 11, Fig. 4, a trellis 12, Fig. 5, or other attachments, and it will be noted that the front wall of the box is downwardly and inwardly inclined so as not to interfere with hanging vines with practically no sacrifice of soil capacity of the box.

The soil may be placed directly within the box or, if desired, insert containers 13 and 14 may be provided, the former resting upon the bottom of the member 7 and the latter resting within the member 8, these containers having suitable handles whereby they may be lifted out of the box and reversed to give both sides of the contained plants the benefit of sunlight, a drain 15 being provided for the box whereby water may be drained into a pail or the like and thus prevent the water from running down the front of the building or dropping upon lower window sills, as at present, and I may provide screw-eyes 16, or the equivalent, whereby the box may be anchored in place.

If desired, the box may be formed of a plurality of units, three of which, 17, 18 and 19, are illustrated, one end of each unit having a dove-tailed vertical channel 20 therein for the reception of a similarly shaped tongue 21 on the adjacent end of the contiguous unit and, if desired, the two end units may have the channel 20 and tongue 21 omitted so as to provide a finish to their outer ends, although I may also provide finishing panels 22 and 23 the former of which is provided with the channel 20 and the latter with the tongue 21, thereby requiring but one form of unit.

My device may be made of any suitable material, such as wood, metal, stone, or concrete, and the insert containers may be of metal suitably perforated for drainage, but I do not desire to limit myself to any specific material and I reserve the right to make structural changes over the details shown and described, provided that such changes do not depart from the spirit of the invention and come within the scope of the appended claims.

Having fully described my invention, what I claim as new, and desire to secure by Letters Patent, is:—

1. A window box having a stepped bottom to form an inner relatively shallow member for resting on a window sill and an outer relatively deep member to depend from said sill.

2. A window box having a stepped bottom to form an inner relatively shallow member for resting on a window sill and an outer relatively deep member to depend from said sill, the front wall of said outer member being downwardly and inwardly inclined to clear pendant plants.

3. A window box having a stepped bottom to form an inner relatively shallow member for resting on a window sill and an outer relatively deep member depending from said sill, and a removable soil container held in said box and conforming to the shapes thereof.

4. A window box composed of an inner relatively shallow member and an outer relatively deep member, and a soil container removably held in each member.

5. A window box composed of a plurality of units each of which comprises a relatively shallow inner member and a relatively deep outer member, one end of each unit having a dove-tailed channel therein and the other end having a similarly shaped tongue thereon adapted to be seated in the channel of the adjacent unit.

6. A window box composed of sections having interlocking connection in end to end relation, and end plates having interlocking connection with the outer ends of the said sections.

ALBERT E. HURST.

Copies of this patent may be obtained for five cents each, by addressing the "Commissioner of Patents, Washington, D. C."